(12) United States Patent
Fukano (10) Patent No.: US 9,769,436 B2
(45) Date of Patent: Sep. 19, 2017

(54) LIGHT SOURCE UNIT INCLUDING LUMINESCENT MATERIAL PLATE AND PROJECTOR

(71) Applicant: CASIO COMPUTER CO., LTD., Shibuya-ku, Tokyo (JP)

(72) Inventor: Kazuyasu Fukano, Hachioji (JP)

(73) Assignee: CASIO COMPUTER CO., LTD, Tokyo (JP)

( * ) Notice: Subject to any disclaimer, the term of this patent is extended or adjusted under 35 U.S.C. 154(b) by 70 days.

(21) Appl. No.: 14/873,294

(22) Filed: Oct. 2, 2015

(65) Prior Publication Data
US 2016/0182869 A1 Jun. 23, 2016

(30) Foreign Application Priority Data
Dec. 19, 2014 (JP) ................................. 2014-257915

(51) Int. Cl.
| | |
|---|---|
| G03B 21/14 | (2006.01) |
| H04N 9/31 | (2006.01) |
| G02B 27/14 | (2006.01) |
| G02B 26/00 | (2006.01) |
| G03B 21/20 | (2006.01) |
| G03B 21/16 | (2006.01) |

(52) U.S. Cl.
CPC ......... *H04N 9/3117* (2013.01); *G02B 26/008* (2013.01); *G02B 27/141* (2013.01); *G03B 21/16* (2013.01); *G03B 21/204* (2013.01); *G03B 21/208* (2013.01)

(58) Field of Classification Search
CPC .. G03B 21/204; G03B 21/005; G03B 21/006; G03B 21/007; H04N 9/3111; H04N 9/3114; H04N 9/3117; G02B 27/1006
See application file for complete search history.

(56) References Cited

U.S. PATENT DOCUMENTS

| | | | | |
|---|---|---|---|---|
| 8,562,141 B2* | 10/2013 | Ogino | ................ | G03B 21/2013 353/38 |
| 9,200,768 B2* | 12/2015 | Ogura | ........................ | F21S 2/00 |
| 2011/0292349 A1* | 12/2011 | Kitano | ................... | G03B 21/20 353/31 |
| 2012/0327374 A1* | 12/2012 | Kitano | ................... | G03B 21/16 353/31 |
| 2013/0077056 A1* | 3/2013 | Okuda | ................ | H04N 9/3105 353/31 |

(Continued)

FOREIGN PATENT DOCUMENTS

| | | |
|---|---|---|
| CN | 102809881 | 12/2012 |
| JP | 2012-185980 | 9/2012 |

OTHER PUBLICATIONS

Chinese Office Action for Chinese Patent Application No. 201510940387.3 mailed on Mar. 1, 2017.

*Primary Examiner* — William C Dowling
(74) *Attorney, Agent, or Firm* — Amin, Turocy & Watson LLP (57) ABSTRACT

A light source unit includes an excitation light source, a luminescent material plate which receives excitation light emitted from the excitation light source to emit luminescent light, a drive module which moves the luminescent material plate in an in-plane direction of a surface of the luminescent material plate, and a drive control module which controls the drive module to move the luminescent material plate on a predetermined cycle.

7 Claims, 8 Drawing Sheets

(56) References Cited

U.S. PATENT DOCUMENTS

2013/0094001 A1* 4/2013 Oda .................. H04N 9/3111
                                                    353/31
2015/0022787 A1   1/2015 Yang et al.

* cited by examiner

LIGHT SOURCE UNIT INCLUDING LUMINESCENT MATERIAL PLATE AND PROJECTOR

CROSS-REFERENCE TO RELATED APPLICATION

This patent application is based upon and claims the benefit of priority under 35 USC 119 from the prior Japanese Patent Application No. 2014-257915 filed on Dec. 19, 2014, the entire disclosure of which, including the description, claims, drawings and abstract, is incorporated herein by reference.

BACKGROUND OF THE INVENTION

Field of the Invention

The present invention relates to a light source unit including a luminescent material plate and a projector including the same light source unit.

Description of the Related Art

In these days, data projectors are used on many occasions as an image projection system which projects an image of a screen and a video image of a personal computer, as well as images based on image data which is stored on a memory card or the like on to a screen. In these data projectors, light emitted from a light source is collected to a micromirror display device called a DMD (Digital micromirror Device) or a liquid crystal panel for displaying a color image on the screen.

Conventionally, the mainstream of these data projectors has been those which utilize a high-intensity discharge lamp as a light source. In recent years, however, there have been developed and proposed, many projectors which utilize, as light sources, red, green and blue light emitting devices or laser diodes or solid-state light emitting elements such as organic ELs or luminescent materials.

It is easy to miniaturize a light source unit which utilizes laser diodes, and the light source unit utilizing the laser diodes can be formed into a small, high-intensity light source unit which is suitable for the projectors described above. However, speckle noise is generated in a projected image using laser beams, resulting in a reduction in image quality of the projected image from time to time.

The Japanese unexamined patent publication No. 2012-185980 (JP-A-2012-185980) proposes a light source unit which emits red light, green light and blue light by the use of a wavelength conversion element which utilizes a luminescent material and a laser beam as excitation light, and luminescent material plates have also been provided which enable the formation of a small, high-intensity light source.

Further, in order to provide a high-intensity and long-life light source, it has also been practiced to translate into parallel a luminescent material plate which functions as a wavelength conversion element in such a way as to vibrate it to thereby change a shining position of excitation light on to the wavelength conversion element, so that the deterioration or burning of the luminescent material can be prevented.

Light sources like the one described above in which the laser beam is used as excitation light and the luminescent material plate which functions as the wavelength conversion element is vibrated are suitable for use in an image projection device such as a projector as small, high-intensity and long-life light sources. However, in light sources in which a laser beam is shone on to a translating luminescent material plate, flicker occurs locally on a screen, making it difficult for an image to be visualized.

SUMMARY OF THE INVENTION

The invention has been made in view of the aforesaid problem inherent in the related art, and an object thereof is to provide a small, high-intensity and long-life light source unit which enables the projection of an image of high picture quality which is bright and easily visualized, and a projector which can be made smaller in size by the use of this light source unit.

According to a first aspect of the invention, there is provided a light source unit having an excitation light source, a luminescent material plate which receives excitation light emitted from the excitation light source to emit luminescent light, a drive unit which moves the luminescent material plate in an in-plane direction of a surface of the luminescent material plate, and a drive control unit which controls the drive unit to move the luminescent material plate on a predetermined cycle.

According to the other aspect of the invention, there is provided a projector including the light source unit according to the first aspect of the invention, a display device which generates imaging light, a projection-side optical system which projects imaging light emitted from the display device on to a screen, and a projector control unit which controls the light source unit and the display device, wherein the drive control unit of the light source unit drives the drive unit in synchronism with the control of the display device by the projector control unit.

DETAILED DESCRIPTION OF THE PREFERRED EMBODIMENT

Figure 1:
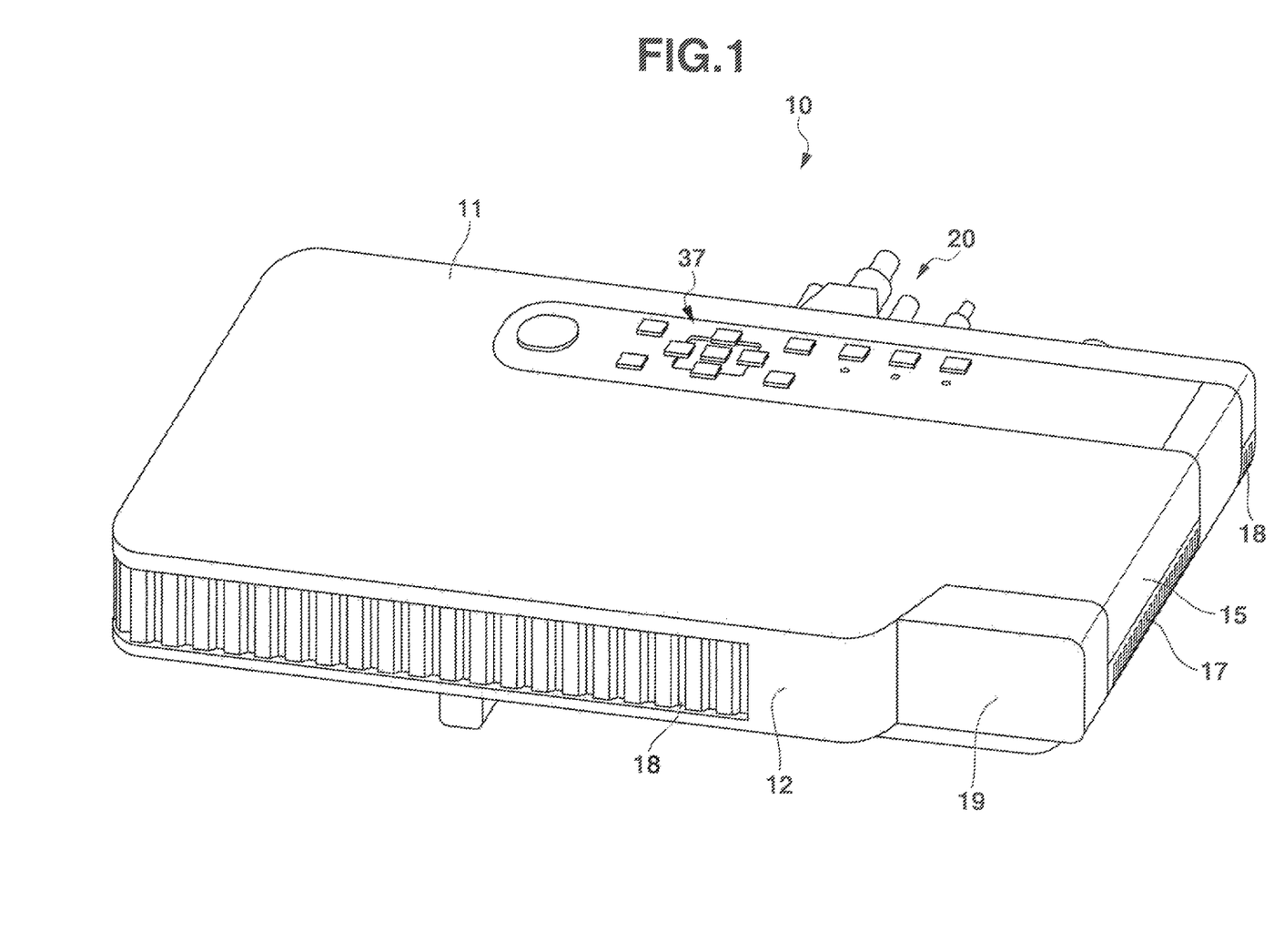
FIG. 1 is an external perspective view showing a projector according to an embodiment of the invention.

Hereinafter, an embodiment of the invention will be described based on the accompanying drawings. FIG. 1 is an external perspective view of a projector 10. When referred to in relation to the projector 10 in this embodiment, left and right denote, respectively, left and right with respect to a projecting direction, and front and rear denote, respectively, front and rear with respect to a direction towards a screen from the projector 10 and a traveling direction of a pencil of light emitted from the projector 10.

The projector 10 has, as shown in FIG. 1, a substantially rectangular parallelepiped shape. The projector 10 has a lens cover 19 which covers a projection port provided to a side of a front panel 12 which is a front side panel of a projector casing. A plurality of outside air inlet ports 18 are provided in the front panel 12. Further, although not shown, the projector 10 includes an Ir reception unit which receives a control signal from a remote controller.

Additionally, a keys/indicators unit 37 is provided on an upper panel 11 of the projector casing. Disposed on this keys/indicators unit 37 are keys and indicators which include a power indicator, a projection switch key, an overheat indicator, and the like. The power indicator informs whether a power switch key or a power supply is on or off. The projection switch key switches on and off the projection by the projector 10. The overheat indicator informs of an overheat condition occurring in a light source unit, a display device, a control circuit or the like when they really overheat.

Various terminals 20 are provided on a back panel of the casing, which include an input-output connector unit where a USB terminal, an image signal input D-SUB terminal where analog RGB image signals are inputted, an S terminal, an RCA terminal, a voice or sound output terminal and the like are provided, a power supply adaptor plug and the like. In addition, a plurality of outside air inlet ports are formed in the back panel. A plurality of inside air outlet ports 17 are formed in each of a right side panel which is a side panel of the casing, not shown, and a left side panel 15 which is a side panel shown in FIG. 1. In addition, outside air inlet ports 18 are also formed in a corner portion defined by the left side panel 15 and the pack panel.

Figure 2:
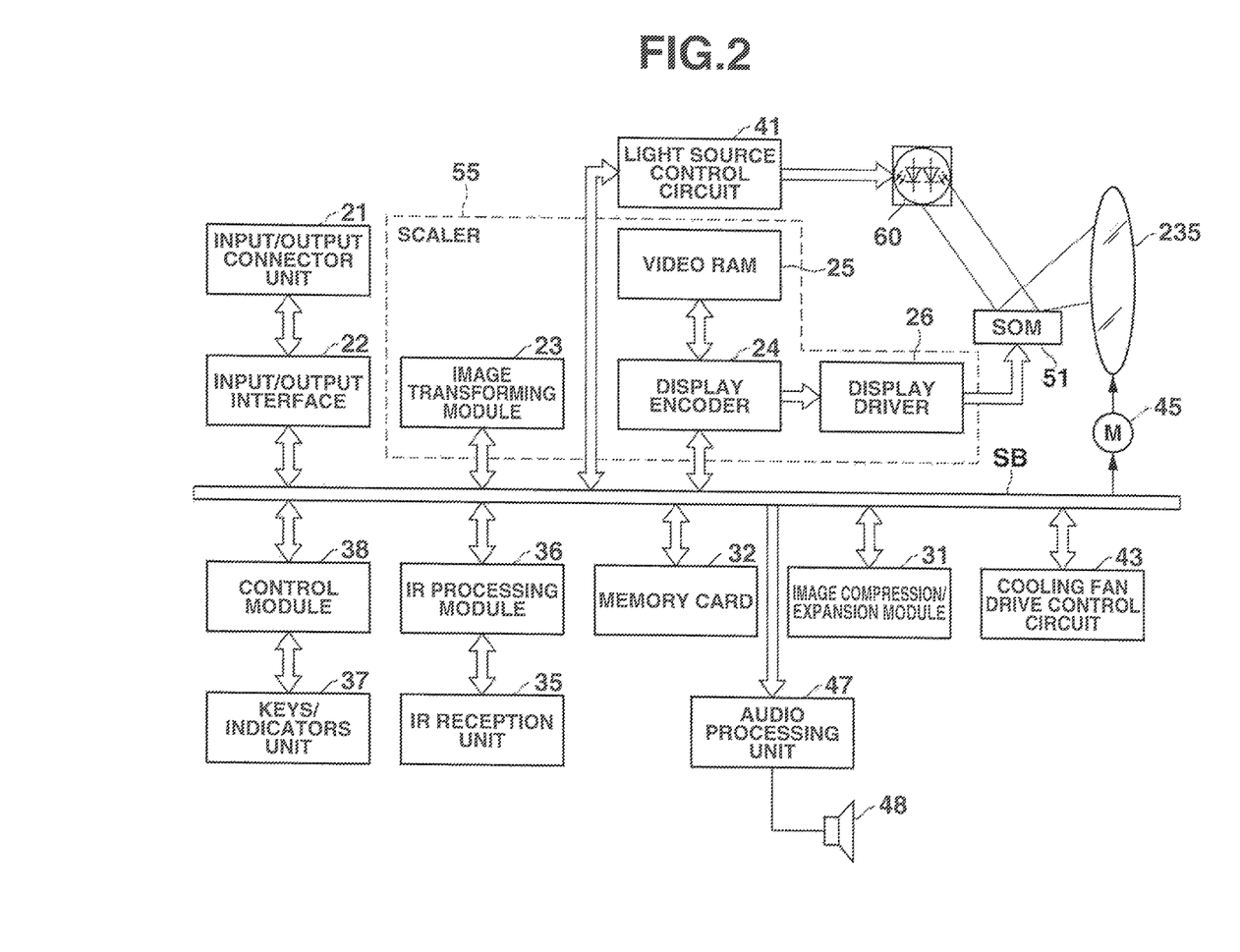
FIG. 2 is a functional block diagram of the projector according to the embodiment of the invention.

Next, a projector control unit of the projector 10 will be described by the use of a functional block diagram shown in FIG. 2. The projector control unit includes a control module 38, an input/output interface 22, an image transforming module 23, a display encoder 24, a display driver 26 and the like. This control module 38 governs the control of operations of circuitries within the projector 10 and is made up of a CPU such as a microprocessor, a ROM which stores in a fixed fashion operation programs of various types of settings, a RAM which is used as a working memory, and the like.

Image signals of various standards that are inputted from the input/output connector unit 21 are sent via the input/output interface 22 and a system bus (SB) to the image transforming module 23 where the image signals are transformed so as to be unified into an image signal of a predetermined format which is suitable for display by the projector control unit. Thereafter, the image signals so transformed are outputted to the display encoder 24.

The display encoder 24 deploys the image signals that have been inputted thereinto on a video RAM 25 for storage therein and generates a video signal from the contents stored in the video RAM 25, outputting the video signal so generated to the display driver 26.

The display driver 26 functions as a display device control module and drives a display device 51, which is a spatial optical modulator (SOM), at an appropriate frame rate in response to an output of the image signal from the display encoder 24 in such a way as to switch on or off individual microscopic mirrors thereon to cause shining light from the light source to be incident on a projection side optical system or to be reflected to other locations than the projection side optical system.

In this projector 10, a pencil of light that is emitted from a light source unit 60 is shone onto the display device 51 via a light shining optical system, whereby imaging light is formed by using reflected light reflected by the display device 51. The image so formed is then projected on to a screen, not shown, for display thereon via the projection side optical system. A movable lens group 235 of the projection side optical system is driven by a lens motor 45 for zooming or focusing.

It is noted that the image transforming module 23, the display encoder 24, the video RAM 25 and the display driver 26 are controlled by the control module 38 and function as a scaler 55.

An image compression/expansion module 31 performs a recording process of data compressing a brightness signal and a color difference signal of the image signal to be sequentially written on a memory card 32 that is a detachable recording medium through operations using ADCT and the Huffman method. Further, when in a reproducing mode, the image compression/expansion module 31 reads out the image data recorded on the memory card 32 and expands individual image data which make up a series of dynamic images frame by frame. Then, the image compression/expansion module 31 outputs the image data to the display encoder 24 via the image transforming module 23 so as to enable the display of dynamic images and the like based on the image data stored on the memory card 32.

Operation signals generated at the keys/indicators unit 37 which includes the main keys and the indicators which are provided on the upper panel 11 of the casing are sent out directly to the control module 38. Key operation signals from the remote controller are received by the Ir reception unit 35, and code signals are demodulated by an Ir processing module 36 to be outputted to the control module 38.

An audio processing unit 47 is connected to the control module 38 via the system bus (SB). This audio processing unit 47 includes a circuitry for a sound source such as a PCM sound source. When in a projection mode and a reproducing mode, the audio processing unit 47 converts audio data into analog signals and drives a loudspeaker 48 to output loudly sound or voice based on the audio data.

The control module 38 controls a light source control circuit 41 which is configured as a light source control unit. This light source control circuit 41 controls separately and individually the emission timings of light in the green wavelength range, light in the red wavelength range and light in the blue wavelength range from an excitation light source module in a green light source device, red light source device and a blue light source device of the light source unit 60 so that those lights in the predetermined wavelength ranges which are required when an image is generated are emitted from the light source unit 60.

The control module 38 causes a cooling fan drive control circuit 43 to detect temperatures through a plurality of temperature sensors which are provided in the light source unit 60 and the like so as to control the rotating speeds of cooling fans based on the results of the temperature detections. The control module 38 also controls the cooling fan drive control circuit 43 so that the cooling fans continue to rotate through a timer even after the power supply to a projector main body is turned off or the power supply to the projector main body is turned off depending upon the results of the temperature detections by the temperature sensors.

Figure 3:
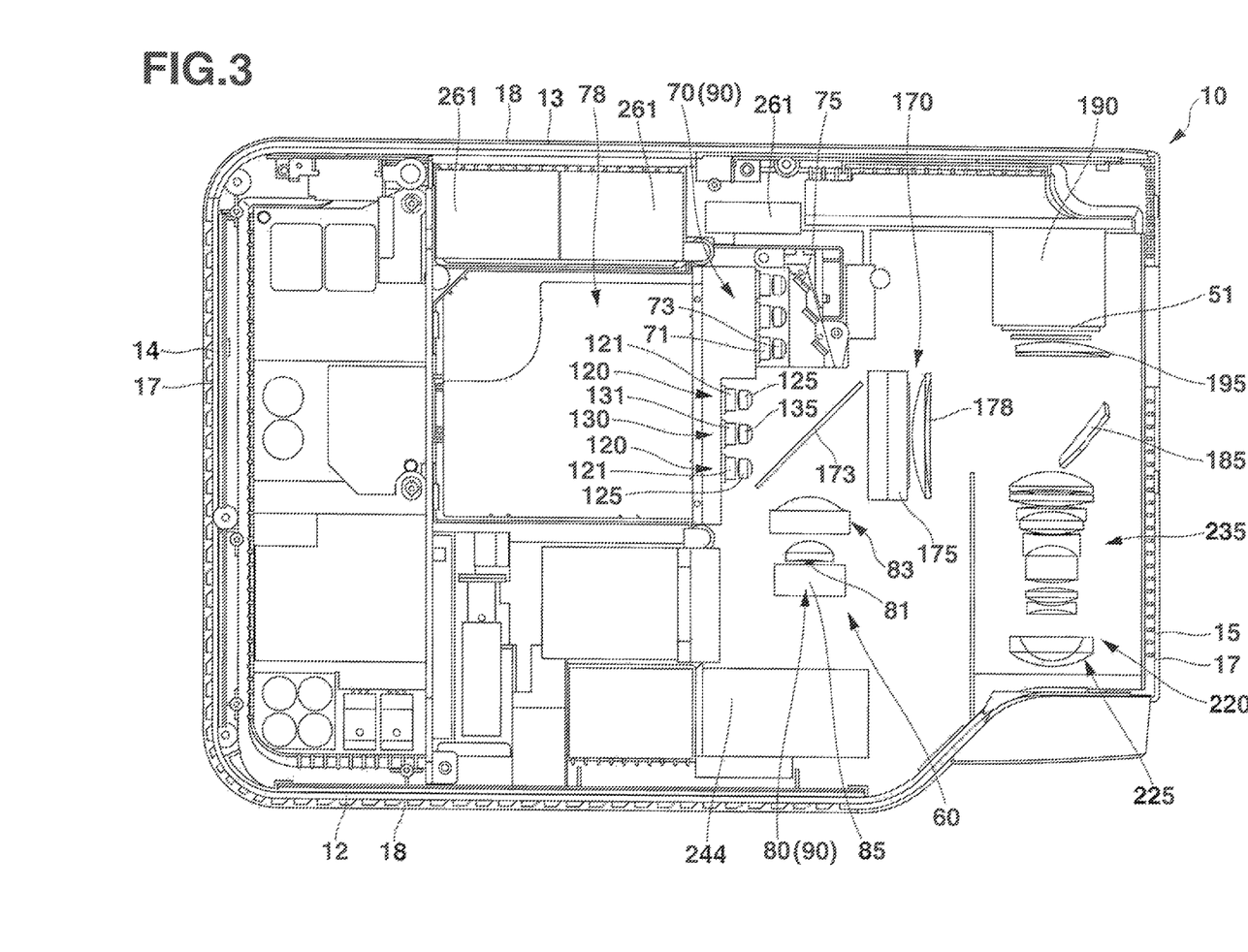
FIG. 3 is a schematic plan view showing an internal construction of the projector according to the embodiment of the invention.

Next, an internal construction of the projector 10 will be described. FIG. 3 is a schematic plan view showing the internal construction of the projector 10. The projector 10 has, as shown in FIG. 3, a control circuit board near the right side panel 14. This control circuit board includes a power supply circuit block, a light source control block and the like. In addition, the projector 10 includes the light source unit 60 to a side of the control circuit board, that is, at a substantially central portion of the projector casing.

This light source unit 60 includes a green light source device 90 which is made up of an excitation light source module 70 which is disposed at a substantially central portion of the projector casing in relation to a left-to-right direction thereof and near the back panel 13 and a luminescent light emitting module 80 which is disposed on an axis of a pencil of light emitted from the excitation light source module 70 and near the front panel 12, a red light source device 120 and a blue light source device 130 which are disposed between the excitation light source module 70 and the luminescent light emitting module 80, and a dichroic mirror 173 which also makes up a light shining optical system 170. The light shining optical system 170 includes further a microlens array 175, a collective lens 178 and a light shining mirror 185.

The excitation light source module 70 of the green light source device 90 includes excitation light sources 71 which are disposed so that their optical axes are parallel to the back panel 13 and which are made up of semiconductor light emitting elements, a reflection mirror group 75 which changes the direction of light emitted from each of the excitation light sources 71 by 90 degrees in the direction of the front panel 12, and a heat sink 78 which is disposed between the excitation light sources 71 and the right side panel 14.

The excitation light sources 71 are a total of six blue laser diodes which are semiconductor light emitting elements, and these laser diodes are arranged into a matrix of two rows and three columns. Collimator lenses 73 are disposed individually on optical axes of the blue laser diodes, and these collimator lenses 73 are collective lenses which convert laser beams emitted from the blue laser diodes into parallel light. The reflection mirror group 75 includes a plurality of reflection mirrors which are arranged into a staircase configuration made up of steps so that pencils of light emitted from the excitation light sources 71 are emitted to the luminescent light emitting module 80 while diminishing the cross-sectional areas of the pencils of light in one direction.

The excitation light emitted from the excitation light sources 71 passes through the dichroic mirror 173, which transmits blue light and red light and reflects green light, and further passes through a collective lens group 83 to be shone on to a luminescent material plate 81 of the luminescent light emitting module 80 with their axes being normal to the luminescent material plate 81. The luminescent material plate 81 includes a luminescent material plate member, into which a luminescent material is sintered to be solidified, as a luminescent material area.

When the excitation light from the excitation light sources 71 is shone on to the luminescent material plate member of the luminescent material plate 81, a luminescent material in the luminescent material plate member is excited to emit luminescent light in the green wavelength range in every direction. The luminescent light so emitted is directed directly to the dichroic mirror 173 or indirectly to the dichroic mirror 173 after having been reflected on a reflecting surface of a heat sink 85 disposed forwards in the traveling direction of the excitation light, which will be described later.

The light in the green wavelength range emitted from the luminescent material plate 81 is reflected by the dichroic mirror 173 so as to be at right angles to the axis of the excitation light and is eventually shone on to the microlens array 175.

A cooling fan 261 is disposed between the heat sink 78 and the back panel 13, and the excitation light source module 70 of the green light source device 90, the red light source device 120 and the blue light source device 130 are cooled by the cooling fan 261 and the heat sink 78.

Further, a cooling fan 216 is also disposed between the reflection mirror group 75 and the back panel 13, and the reflection mirror group 75 is cooled by this cooling fan 261.

The luminescent light emitting module 80 of the green light source device 90 includes the luminescent material plate 81 which is disposed so as to be parallel to the front panel 12, that is, so as to be parallel to the axis of the excitation light emitted from the excitation light source module 70, the collective lens group 83 which collects the excitation light which is shone on to the luminescent material plate 81 and the luminescent light emitted from the luminescent material plate 81, and the heat sink 85.

The reflecting surface is formed on the heat sink 85 by mirror finishing the surface in question through silver deposition or the like, and the luminescent material area of a luminescent material layer is disposed on the reflecting surface. This luminescent material area of the luminescent material plate 81 may be a sintered member, for example. Alternatively, the reflecting surface is not formed on the heat sink 85, and the luminescent material area of the luminescent material plate 81 may be such that a luminescent material is placed on a metallic plate on which a reflecting surface is formed.

Further, a cooling fan 244, which is a cooling device, is disposed on a side of the luminescent light emitting module 80 which faces the front panel 12, and the heat sink 85 of the luminescent light emitting module 80 is cooled by this cooling fan 244.

The red light source device 120 is disposed so that optical axes of its light sources intersect the axis of the excitation light, which is incident on the luminescent light emitting module 80, at right angles. The red light source device 120 includes four red light sources 121 which are made up of four light emitting elements which are disposed in four corners of a light emitting diode group of two rows and three columns and a collective lens group 125 which collects light emitted from the red light sources 121. The red light sources 121 are red light emitting diodes which are semiconductor light emitting elements which emit light in the red wavelength range.

Light in the red wavelength range which is emitted from the red light source device 120 passes through the dichroic mirror 173 and is then shone on to the microlens array 175 of the light shining optical system 170 with the axis of the light in the red wavelength range being aligned with the axis of the light in the green wavelength range which is emitted from the luminescent light emitting module 80.

The blue light source device 130 is disposed so that optical axes of its light sources intersect the axis of the excitation light, which is incident on the luminescent light emitting module 80, at right angles. The blue light source device 130 includes two blue light sources 131 which are made up of two light emitting elements which are disposed in the center of the light emitting diode group of two rows and three columns and a collective lens group 135 which collects light emitted from the blue light sources 131. The blue light sources 131 are disposed so as to be aligned with the red light sources 121 which are positioned in the four corners of the light emitting diode group of two rows and three columns. The blue light sources 131 are blue light emitting diodes which are semiconductor light emitting elements which emit light in the blue wavelength range.

Light in the blue wavelength range which is emitted from the blue light source device 130 passes through the dichroic mirror 173 and is shone on to the microlens array 175 of the light shining system 170 as with the light in the red wavelength range and the light in the green wavelength range emitted from the luminescent light emitting module 80.

A heat sink 190 for cooling the display device 51 is disposed between the display device 51 and the back panel 13, and the display device 51 is cooled by this heat sink 190.

A condenser lens 195 is disposed near the front of the display device 521. This condenser lens 195 allows light from the light shining mirror 185 of the light shining system 170 to be incident on the display device 51, which is made up of digital micromirror devices (DMDs), at an appropriate angle and ON light, which is reflected by the display device 51 and then emitted from the display device 51, to be incident on a projection side optical system 220.

A lens group of the projection side optical system 220 emits the ON light reflected on the display device 51 on to a screen. This projection side optical system 220 is made up of a variable-focus lens including a fixed lens group 225 which is incorporated in a fixed lens barrel and the movable lens group 235 which is incorporated in a movable lens barrel for zooming. Zooming and focusing are enabled by moving the movable lens group 235 by the lens motor.

The light in the red wavelength range which is emitted from the red light emitting diodes which are the four red light sources 121 making up the red light source device 120 is caused to be incident on a predetermined shining area on the microlens array 175 of the light shining optical system 170 by the collective lens group 125.

The light in the blue wavelength range which is emitted from the blue light emitting diodes which are the two blue light sources 131 making up the blue light source device 130 which is disposed so as to be held by the red light sources 121 from both sides thereof is also caused to be incident on a predetermined shining area on the microlens array 175 by the collective lens group 135.

Because of this, the light emitted from the red light sources 121 and the light emitted from the blue light sources 131 pass through the dichroic mirror 173 to be incident on the microlens array 175 at right angles. Thus, the pencils of light from the various light sources are shone on to the microlens array 175 according to the arrangement of the light sources.

In the green light source device 90, the laser beams from the excitation light sources 71 of the excitation light source module 70 are converted into pencils of substantially parallel light by the corresponding collimator lenses 73, and the pencils of light also become parallel to one another. Then, the parallel pencils of light are pass through the dichroic mirror 173 of the light shining optical system 170, are collected by the collective lens group 83 and are shone on to the luminescent material plate 81, whereby luminescent light is emitted from the luminescent material plate 81.

The luminescent light emitted from the luminescent material plate 81 is converted into a pencil of substantially parallel light by the collective lens group 83 and is then reflected by the dichroic mirror 173 to be shone on to substantially the whole surface of the microlens array 175 at right angles.

Light incident on incident surfaces of areas of the microlens array 175 of the light shining system 170 is collected so as to be superposed on one another on predetermined areas on the surface of the display device 51 by the collective lens 178.

Consequently, the light in the red wavelength range, the light in the green wavelength range and the light in the blue wavelength range are shone on to the display device 51 as pencils of light whose luminance is uniformly distributed by the microlens array 175 and the collective lens 178.

The light in the red wavelength range emitted from the red light source device 120, the light in the green wavelength range emitted from the green light source device 90 and the light in the blue wavelength range emitted from the blue light source device 130 are sequentially shone on to the display device 51 in a time sharing fashion. The microscopic mirrors of the display device 51 are respectively controlled to reflect the light in the red wavelength range by the display driver 26 when the light in the red wavelength range is shone on thereto, whereby the display device 51 project red imaging light on to the screen, not shown, via the projection side optical system 220, and a red image is formed on the screen.

Similarly, when the light in the green wavelength range is shone on thereto, the display device 51 forms a green image on the screen by green imaging light, and when the light in the blue wavelength range is shone on thereto, the display device 51 forms a blue image on the screen by blue imaging light. Thus, the display device 51 sequentially forms red images, green images, blue images 120 times per second to thereby enable the projection of a full color image on the screen.

Figure 4:
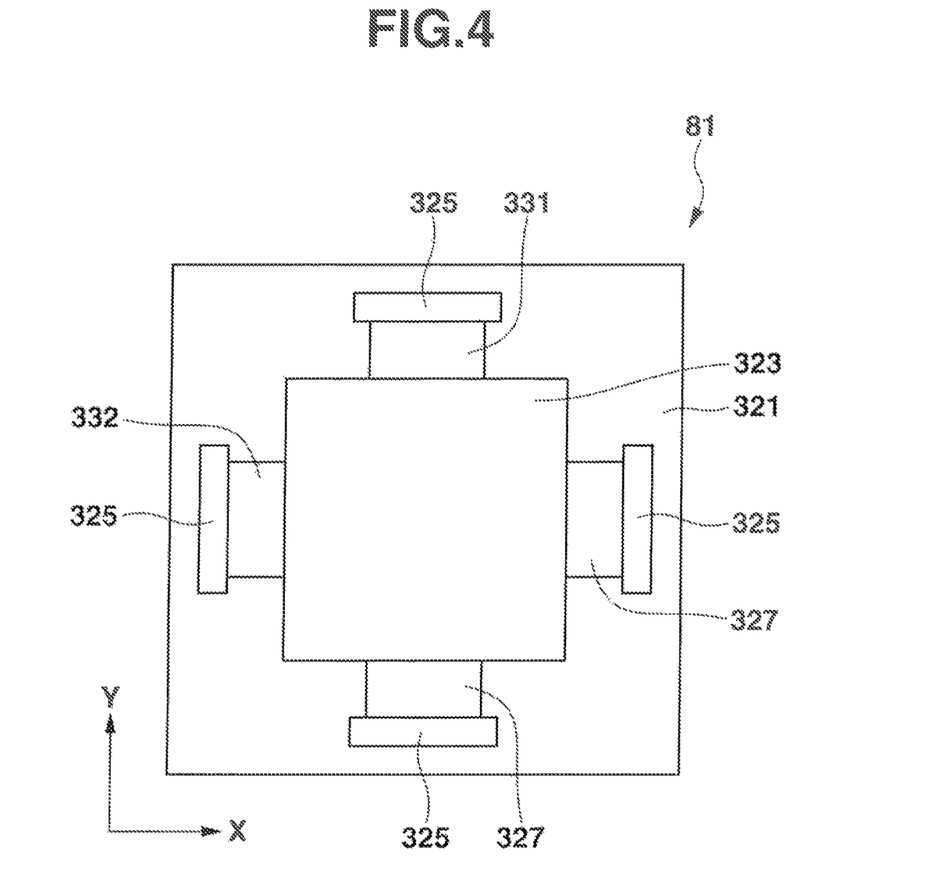
FIG. 4 is a diagram showing an example of a wavelength conversion element which is used in a light source unit according to the embodiment of the invention.

In the luminescent material plate 81 which is the green light source of the light source unit 60, as shown in FIG. 4, a luminescent material plate member 323 which constitutes a luminescent material area is held in such a way as to move relative to a plate substrate 321 in an in-plane direction which is a planar direction of a surface of the luminescent material plate member 323.

Namely, the luminescent material plate member 323 is positioned in the center of four support portions 325 which are formed on the plate substrate 321 so as to be disposed on four circumferential sides of the luminescent material plate member 323. Two adjacent sides of the luminescent material member 323 are supported by elastic members 327 which are attached individually to the two support portions 325, and the other two sides of the luminescent material plate member 323 are respectively supported by a voice coil motor which is a first drive device 331 attached to one the remaining two support portions 325 and a voice coil motor which is a second drive device 332 attached to the other of the remaining two support portions 325. Thus, the luminescent material plate member 323 is supported so as to be reciprocated in a Y direction by the first drive device 331, and the luminescent material plate member 323 is supported so as to be reciprocated in an X direction by the second drive device 332.

Figure 5:
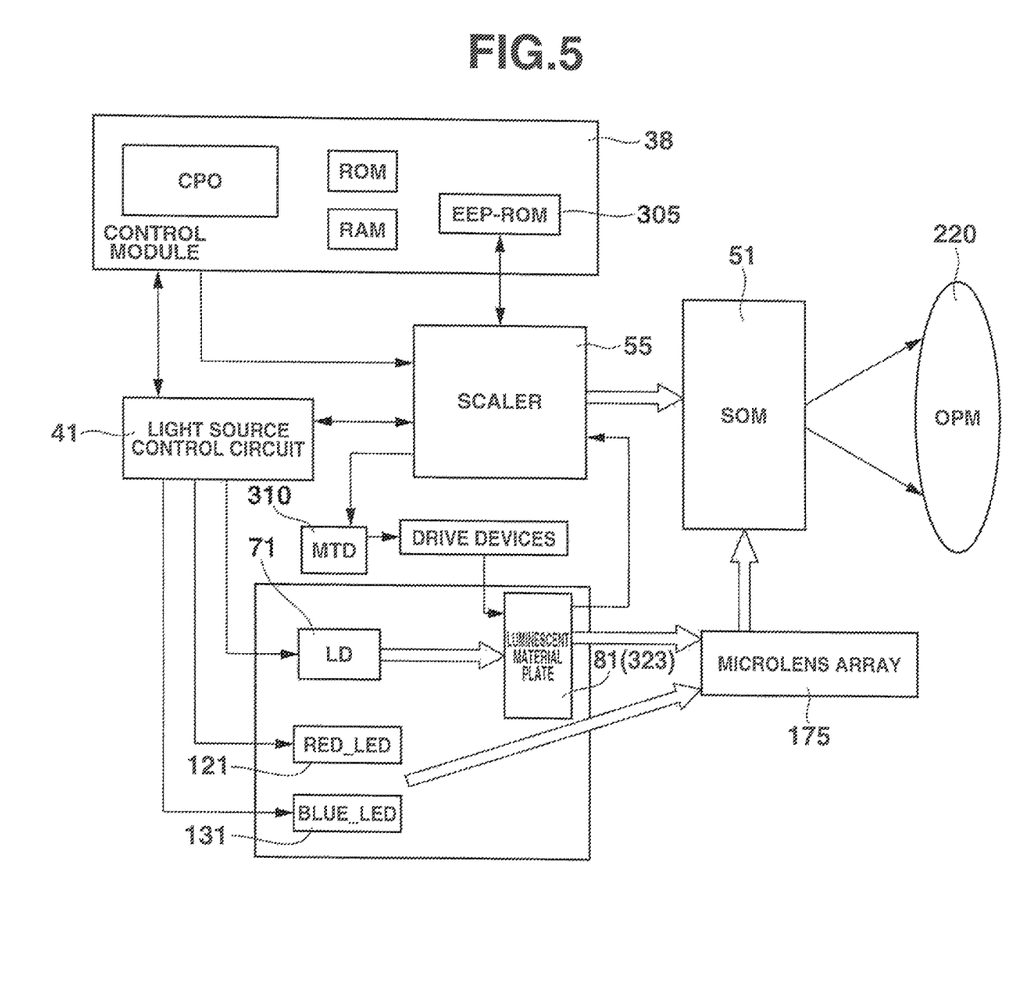
FIG. 5 is a block diagram showing constituent elements of the projector according to the embodiment of the invention which are involved in an image forming control.

Then, as shown in FIG. 5, in controlling the blue laser diodes which are the excitation light sources 71, the red light emitting diodes which are the red light sources 121, and the blue light emitting diodes which are the blue light sources 131 to be illuminated sequentially by the light source control circuit 41, the display device 51 is controlled by the scaler 55 to form a green image, a red image and a blue image.

Additionally, the first drive device 331 and the second drive device 332 which are built in the plate member of the luminescent material plate 81 are also controlled to be driven by the scaler 55 via a motor driver (MTD) 310.

Figure 6:
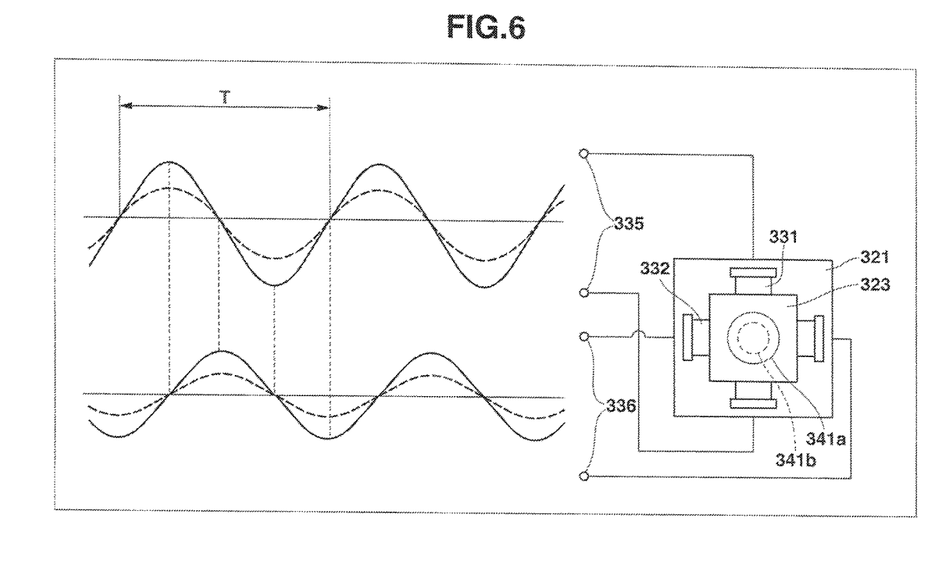
FIG. 6 is a diagram showing a control state of the wavelength conversion element which is used in the light source unit according to the embodiment of the invention.

In drive controlling the first drive device 331 and the second drive device 332, as shown in FIG. 6, an alternating-current voltage of a period of T which is applied to a first terminal 335 which constitutes an input terminal of the voice coil motor which is the first drive device 331 and an alternating-current voltage of the same period of T which is applied to a second terminal 336 which is an input terminal of the voice coil motor which is the second drive device 332 are so applied with a phase different of 90 degrees.

Consequently, the extension and contraction of the first drive device 331 which is the drive module for reciprocating the luminescent material plate member 323 in the Y direction and the extension and contraction of the second drive device 332 which is the drive module for reciprocating the luminescent material plate member 323 in the X direction are shifted 90 degrees in phase, so that a periodical motion of the luminescent material plate member 323 becomes a circular motion and a shining locus 341a of the excitation light shone on to the luminescent material plate member 323 is made to be circular, whereby excitation light is shone on to a wide range on the luminescent material plate member 323 to delay the deterioration of the luminescent material plate member 323. Thus, the long-life green light source device 90 can be provided.

In the case of the projector having a plurality of modes such as a high luminance mode or a low luminance mode, the alternating-current voltage applied to the first terminal 335 and the alternating-current voltage applied to the second terminal 336 are respectively given in different waveforms with each other so that the shining locus of excitation light can be made to differ. For example, in the low luminance mode, waveforms indicated by broken lines in FIG. 6 are adopted, while in the high luminance mode, waveforms indicated by solid lines are adopted. When comparing the waveforms indicated by the broken lines with the waveforms indicated by the solid lines, the phases of the waveforms are the same. However, by increasing the amplitudes of the waveforms of the alternating-current voltage applied to the first terminal 335 and the waveforms of the alternating-current applied to the second terminal 336, a shining locus 341a indicated by a solid line can be made larger than a shining locus 341b indicated by a broken line. Consequently, even though excitation light of high luminance is shone on to the luminescent material plate member 323, an increase in temperature can be suppressed, and projection can be executed with good efficiency.

Figure 7:
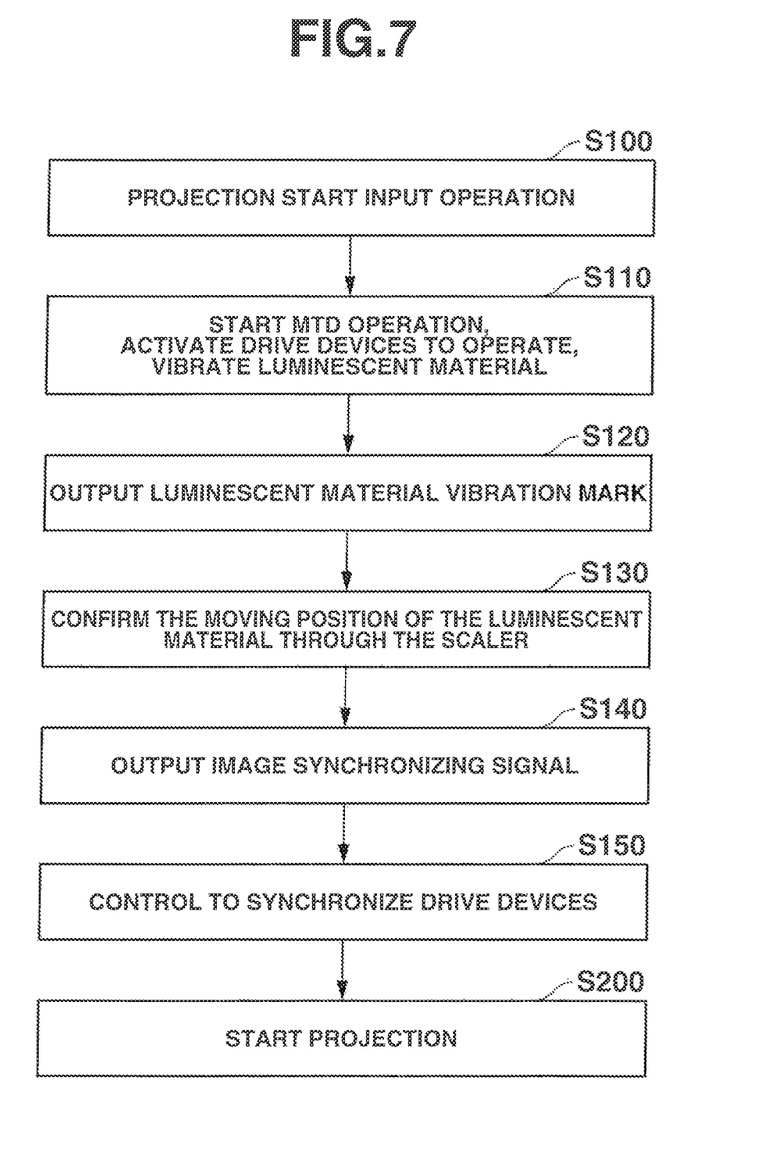
FIG. 7 is a flowchart showing a procedure of the image forming control in the projector according the embodiment of the invention.

In moving the luminescent material plate member 323, the control module 38 and the scaler 55 which function as the drive control module start the operation of the motor driver 310 once a projection starting input operation (S100) is performed as shown in FIG. 7. Then, the first drive device 331 and the second drive device 332 are activated to operate to vibrate the luminescent material plate member 323 in the X direction and the Y direction, starting the circular motion of the luminescent material plate member 323 (S110).

Then, the position of the luminescent material plate member 323 is detected to thereby detect the moving position of the luminescent material plate member 323 (S120). A timing signal which signals a passage of the luminescent material plate member 323 through a constant position is inputted into the scaler 55, where the moving position of the luminescent material plate member 323 is confirmed (S130). Then, an image synchronizing signal output (S140) is executed where an image synchronizing signal is formed in synchronism with the timing at which the luminescent material plate member 323 passes through the constant position.

Further, a drive device synchronizing control (S150) is executed where the vibration period of the first drive device 331 and the second drive device 332 by the motor driver 310 is an integral multiple of a period of one frame of an image including one time of the period. Then, the light source control circuit 41 is caused to start the illumination control of the red light sources 121, the excitation light sources 71 and the blue light sources 131 to start the projection (S200).

Consequently, in forming a red image, a green image, and a blue image, the shining position of excitation light on to the luminescent material plate member 323 when light in the green wavelength range is emitted from the luminescent material plate member 323 can be made to stay at the same location on the luminescent material plate member 323.

This prevents a light emitting position on the luminescent material plate member 323 which is used to emit green image light from changing with frame of image, even though the luminance of luminescent light emitted from the luminescent material plate member 323 is slightly changed depending upon the excitation light shining position on the luminescent material plate member 323 by the uneven coating of a luminescent material coated on the luminescent material plate member 323, whereby the light source unit 60 and the projector 10 can be provided which are free from image shaking.

The vibrating period and vibrating width of the first drive device 331 and the second drive device 332 are stored in an EEP-ROM 305 of the control module 38, and the luminescent material plate member 323 is controlled to be driven so that its period is aligned with the period of the image synchronizing signal of the video signal by the control module 38 and the scaler 55. Namely, the drive control module of the light source unit 60 controls the drive of the first drive device 331 and the second drive device 332, which are the drive module, in synchronism with the control of the display device 51 by the projector control unit.

Figure 8:
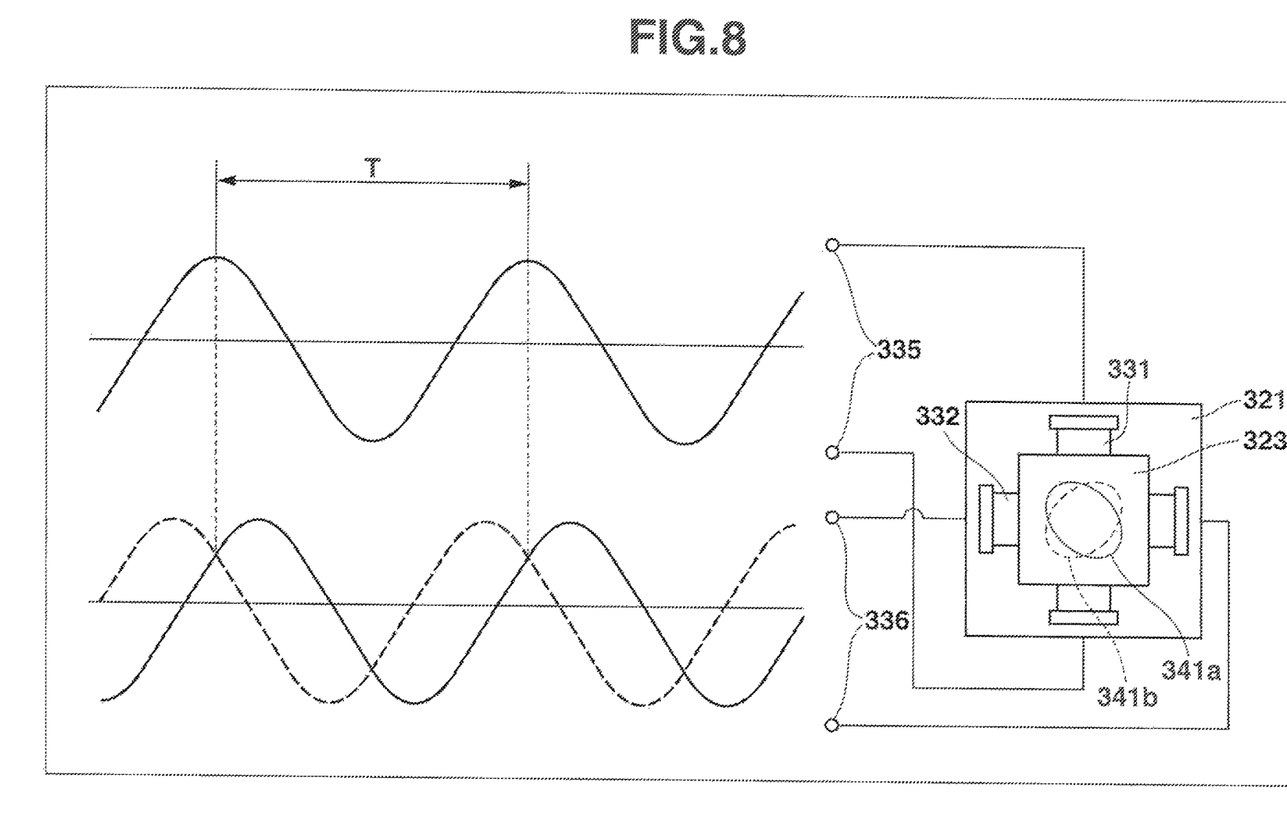
FIG. 8 is a diagram showing another control state of the wavelength conversion element which is used in the light source unit according to the embodiment of the invention.

In controlling the drive of the luminescent material plate member 323, the invention is not limited to the case where the shining locus 341 of excitation light is made round by controlling the luminescent material plate member 323 so as to perform the circular motion as shown in FIG. 6. The shining locus of excitation light may take an elliptic shining locus 341a as shown in FIG. 8 by shifting the phase of a drive voltage applied to the first drive device 331 from the phase of a drive voltage of a period of T which is applied to the second drive device 332.

The phase of the second drive device 332 indicated by a solid line is shifted at a predetermined amount (+45 degrees) relative to the phase of the first drive device 331. However, by shifting the phase of the second drive device 322 at the same amount as the amount indicated by the solid line in an opposite direction (−45 degrees) relative to the phase of the first drive device 331 like a phase of the second drive device 332 indicated by a broken line, the shining locus of excitation light becomes a shining locus 341b as indicated by a broken line in FIG. 8 which is at right angles to the shining locus 341a.

In this way, since the shining locus 341a and the shining locus 341b are both elliptic and are at right angles to each other, the shining locus 341a and the shining locus 341b overlap only at four points. Consequently, for example, in the event the shining locus 341a and the shining locus 341b are used alternately in such a way that the shining locus 341a is used for projections of odd-numbered times while the shining locus 341*b* is used for projections of even-numbered times, the luminescent material in the luminescent material plate 81 can be used evenly.

Further, according to a shape of the luminescent material plate member 323, in the case of the luminescent material plate member 323 being rectangular, only one drive device is provided to vibrate the luminescent material plate member 323 so as to reciprocate it rectilinearly along a longitudinal direction of the luminescent material plate member 323 while being synchronized with the control of the display device 51. By adopting this configuration, the light source unit 60 can be made smaller in size.

In shining excitation light on to the luminescent material plate member 323, the axis of the excitation light shone is made normal to the luminescent material plate member 323, whereby the excitation light can be shone on to local portions on the luminescent material plate member 323 with good efficiency to enhance the emission efficiency of excitation light. Additionally, light in the green wavelength range which is emitted from the luminescent material plate member 323 can be incident on the collective lens group 83 which collects excitation light, whereby the green light source can be configured compact easily.

The first drive device 331 and the second drive device 332 are not limited to the voice coil motors, and hence, small drive devices such as a piezo-electric actuator will be good enough for use as the drive devices.

In the light source unit 60 shown in FIG. 3, while the dichroic mirror 173 disposed between the excitation light source module 70 and the luminescent light emitting module 80 is described as transmitting the light in the red wavelength range and the light in the blue wavelength range while reflecting the light in the green wavelength range, the invention is not limited thereto. A configuration may be adopted in which the red light source device 120 and the blue light source device 130 and the luminescent light emitting module 80 are disposed so as to be aligned in such a way that the axes of light emitted therefrom become parallel to one another while the excitation light source module 70 is disposed so that the axis of excitation light emitted therefrom is at right angles to the axes of the light in the red wavelength range, light in the blue wavelength range and light in the green wavelength range.

As this occurs, as the dichroic mirror disposed in front of the excitation light emitting module 80, a dichroic mirror may be used from time to time which reflects excitation light so as to shine it on to the luminescent material plate 81 while transmitting light in the green wavelength range emitted from the luminescent material plate 81.

Further, the excitation light sources 71 of the excitation light source module 70 are not limited to the laser diodes which emit light in the blue wavelength range. Hence, a laser diode which emits ultraviolet radiation may be used as the excitation light sources 71 from time to time.

The projector 10 shown in FIG. 3 utilizes the microlens array 175 in the light shining optical system 170 so that light source light is converted into a pencil of light whose luminance is uniformly distributed by the microlens array 175 and the collective lens 178. However, a light tunnel or a light guiding rod may be used from time to time in place of the microlens array 175.

Additionally, the projector 10 utilizes the light emitting diodes for the red light sources 121 and the blue light sources 131. However, the projector 10 may utilize laser diodes for the red light sources 121 and the blue light sources 131. As this occurs, laser beams are diffused by the use of a diffusing plate, and the diffusing plate is made to perform a rectilinear reciprocating motion or a circular motion by the use of one or two drive devices to remove speckle noise. As this occurs, the period of the reciprocating motion or circular motion is synchronized with the image synchronizing signal.

In this way, even though the diffusing state of the diffusing plate slightly changes depending upon the shining position of the laser beam, by synchronizing the motion period of the diffusing plate with the synchronizing signal of the image, a projected image can be formed by the use of the light source light which passes through the same location on the diffusing plate even in the event that frames of images are switched over, whereby the projected image can be made easier to be visualized.

While the invention has been described heretofore based on the embodiment, the embodiment is described to represent one of examples, and hence, the scope of invention is not intended to be limited by the embodiment. This novel embodiment can be carried out in other various forms, and hence, various omissions, replacements and/or modifications can be made thereto without departing from the spirit and scope of the invention. The embodiment and its resulting modifications are included in the spirit and scope of the invention, as well as in the scope of inventions described in claims and equivalents thereof.

What is claimed is:

1. A light source unit comprising:
   an excitation light source;
   a luminescent material plate which receives excitation light emitted from the excitation light source to emit luminescent light;
   a drive module which moves the luminescent material plate in an in-plane direction of a surface of the luminescent material plate; and
   a drive control module which controls the drive module to move the luminescent material plate on a predetermined cycle, wherein
   the drive module has a first drive module and a second drive module, and the first drive module and the second drive module move the luminescent material plate in directions which intersect substantially at right angles.

2. The light source unit according to claim 1, wherein
   the drive control module causes the luminescent material plate to perform a circular motion by controlling so that the movement of the luminescent material plate by the first drive module shifts in phase from the movement of the luminescent material plate by the second drive module.

3. The light source unit according to claim 1, comprising further:
   a dichroic mirror disposed in front of the luminescent material plate, wherein
   the excitation light is shone substantially normal to the luminescent material plate, and the luminescent light is separated from an axis of the excitation light by the dichroic mirror.

4. The light source unit according to claim 2, comprising further:
   a dichroic mirror disposed in front of the luminescent material plate, wherein
   the excitation light is shone substantially normal to the luminescent material plate, and the luminescent light is separated from an axis of the excitation light by the dichroic mirror.

5. The light source unit according to claim 1, comprising further:

a light emitting diode which emits light in the red wavelength range as a red light source; and a light emitting diode which emits light in the blue wavelength range as a blue light source, wherein the luminescent light is light in the green wavelength range.

6. The light source unit according to claim 2, comprising further:

a light emitting diode which emits light in the red wavelength range as a red light source; and a light emitting diode which emits light in the blue wavelength range as a blue light source, wherein the luminescent light is light in the green wavelength range.

7. A projector comprising:

the light source unit according to claim 1;

a display device which generates imaging light;

a projection side optical system which projects imaging light emitted from the display device on to a screen; and a projector control unit which controls the light source unit and the display device, wherein the drive control module of the light source unit drives the drive module in synchronism with the control of the display device by the projector control unit.

* * * * *